United States Patent Office 3,424,232
Patented Jan. 28, 1969

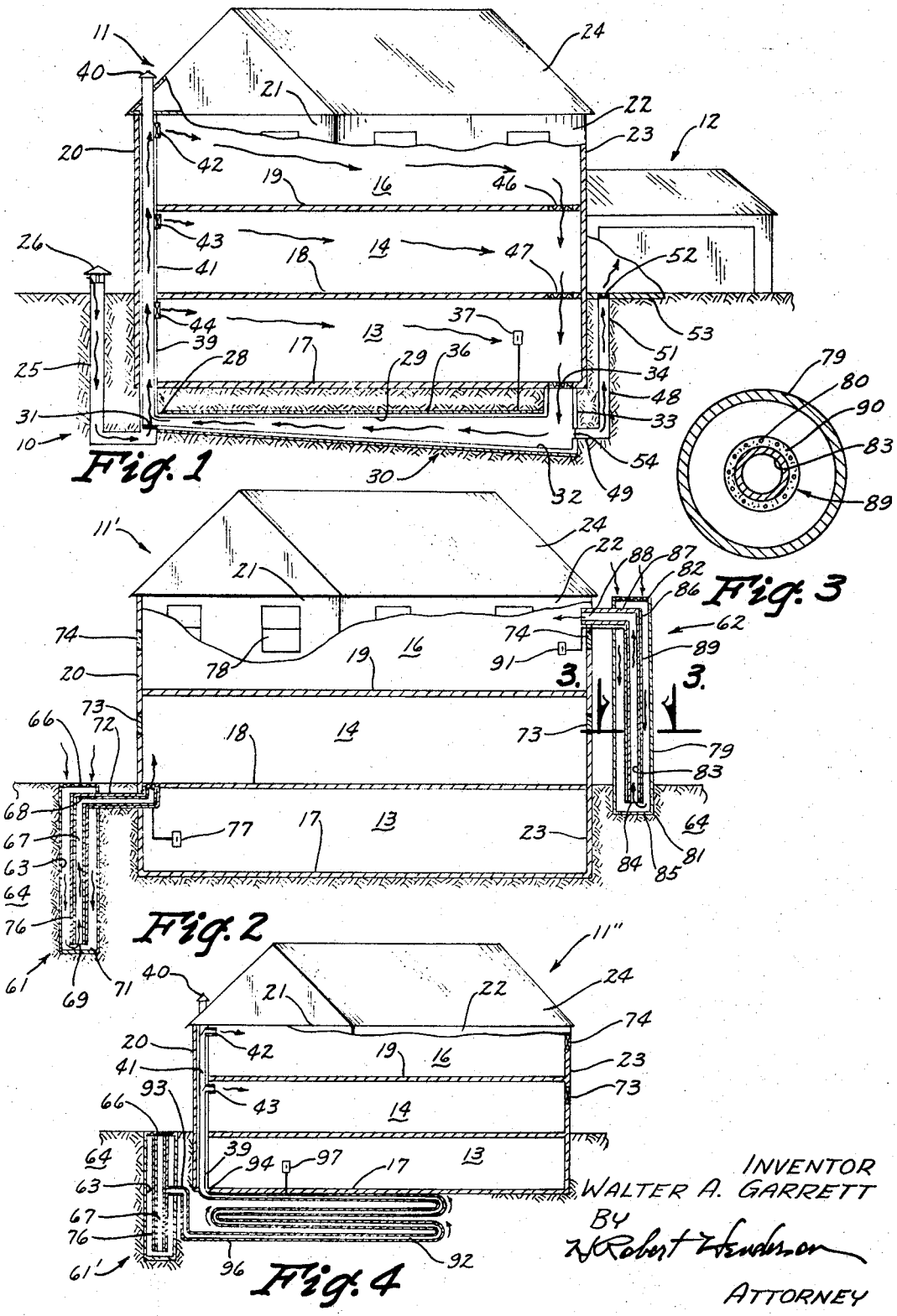

3,424,232
HEATING AND COOLING SYSTEM
Walter A. Garrett, 1355 S. 21st,
Fort Dodge, Iowa 50501
Filed Oct. 24, 1967, Ser. No. 677,545
U.S. Cl. 165—45   8 Claims
Int. Cl. F25b 29/00; F24f 3/00; F24j 3/04

ABSTRACT OF THE DISCLOSURE

This invention relates to a heating and cooling system which utilizes the temperature of the ground in combination with the natural tendency of air to flow due to variation of temperature, and due further to air to flow in response to variation of restriction to flow. One system comprises a conduit for leading outside air to the small end of a gradually narrowing duct formed under a building, a pipe leading upwardly from the junction into an outlet adjacent the ceiling in one or more rooms, with a register in the floor of each room having an outlet, the registers connecting through the floors to the large end of the duct, thereby setting up a natural flow of the air without the need of fans and the like. Electric wires and insulation are wrapped about the duct for heating the air passing therethrough in the winter, while the coolness of the ground about the duct is used to cool the air passing therethrough in the summer.

Background of the invention

This invention relates to the field of heating and cooling the air within an enclosure.

To cool the conventional residence or commercial building by means other than the use of outside air flowing therethrough requires the use of artificially cooled air forced through the building by fans or the like. There is no other system known to applicant, other than the system described hereinafter, for accomplishing this purpose.

Summary of the invention

The gist of the invention is the creation of a flow of air through an enclosure by using conduits, openings strategically placed, and the laws of nature, without the use of fans or the like, passing the air flow through a duct in the soil for obtaining a heat transfer in the summer, and electrically heating the air passing through the duct in the winter for warming same.

Brief description of the drawings

FIG. 1 is a view of the interior of a building and the soil thereabout showing an embodiment of the system of this invention.

FIG. 2 is a view similar to FIG. 1, and showing another embodiment of the system of this invention.

FIG. 3 is an enlarged cross-section taken along the lines 3—3 in FIG. 2; and

FIG. 4 is a view similar to FIGS. 1 and 2 and showing a third embodiment of the system of this invention.

Description of the preferred embodiment

Referring to FIG. 1, one embodiment of this invention, indicated generally at 10, is shown in assembled relation with a dwelling 11 having a garage 12 attached therewith.

The dwelling 11 has a basement area 13, a first floor area 14, and a second floor area 16 formed by a basement floor 17, a first floor 18, a second floor 19 and exterior walls 20, 21, 22 and 23, in addition to the roof 24.

The heating and cooling system 10 comprises a vertical pipe 25 having a vent 26 at the upper open and exposed end of the pipe, the lower end thereof connected by a short pipe 27 to the small end 28 of an elongated duct 29 extended substantially completely beneath the dwelling 11 and surrounded by soil, the latter indicated generally at 30. A damper 31 is provided at the junction of the pipe 27 and end 28, operated from above by conventional means (not shown) for opening and closing the pipe 27 from the duct 29.

The duct 29 has a large end 32 (FIG. 1) open by means of a large pipe 33 to the basement area 13, a register 34 being provided for conventional purposes. It can readily be noted that the duct 29 tapers in cross-sectional area for transmitting fluid from the large end 32 to the small end 28. Wrapped completely about the duct 29 its entire length is a blanket 36 of insulation and electric wiring. The wiring of the blanket 36 is connected through a grounded wall switch 37 to house electric power, and when energized is operable to heat the duct 29 and thus any air therein.

The small end 28 of the duct 29 is fluidly connected to the lower end 39 of an elongated, vertical conduit 41 which extends upwardly through all floors 18 and 19, and which extends further through the roof 24, having a vent cap 40 at its upper end for protection. Inside the dwelling 11, the conduit 41 is provided with combination outlet and damper devices 42, 43, and 44 each adjacent the ceiling, respectively, of the second floor area 16, the first floor area 14, and the basement area 13. Operation of either damper device serves to withdraw more or less air from the conduit 41 for transmission into the dwelling. It will also be noted that registers 46 and 47 are formed in the second and first floors 19 and 18 directly above the basement register 34.

Although not necessary to heating and cooling the dwelling 11, the garage 12 may receive some effect of the dwelling system by having a right angle pipe 48 attached at its lower end 49 to the large end 32 of the duct 29, with its upper end 51 opening through a register 52 in the floor 53 of the garage.

In operation of the system of FIG. 1, fresh air enters the pipe 25 and then rises through the conduit 41 where it exits at any of the outlet devices 42, 43 and 44 which are open. The air within each area then exits through a respective register 46, 47 and/or 34 downward into the large end of the duct 29. The air then moves toward the small end 28 as indicated by the arrows whereat it repeats the cycle just described.

As the air passes through the duct 29, it transfers some of its heat to the cool or cold soil and thus the air passing upward through the conduit 41 is more cool than that entering the duct at the large end 33. In the cold months, however, by heating the duct 29, the air therein is heated, and the reverse is true in that the temperature of the air entering the duct 29 is higher than that leaving; all heating and cooling without the benefit of fans or the like.

The damper 31 may be opened or closed as desired by the householder, and a damper 54 in the pipe 48 leading to the garage 12 may also be controlled by conventional means (not shown).

Referring now to FIG. 2, the dwelling 11' is similar, without the garage, with like parts indicated by like reference numerals but with a pair of substantially identical heating and cooling systems 61 and 62 shown in different arrangements.

The system 61 comprises a vertical duct 63 about thirty feet deep inserted in the ground 64, the duct 63 being about one and one-half feet in diameter. The duct is covered by a grate 66. A pipe 67 having approximately a six inch diameter is inserted centrally of the duct 63, with its upper end 68 closed and the lower end 69 open and spaced upwardly from the floor 71 of the hole within which the duct 63 is inserted; in fact, the duct 63 could be eliminated with nothing but a vertical hole performing the same function as the duct.

At the upper end 68 of the pipe 67, a short, horizontal conduit 72 fluidly connects the pipe 67 to the first floor area 14, as it could be the basement area 13 and the second floor area 16. It will be noted the floor registers of the FIG. 1 dwelling 11 are eliminated in the FIG. 2 dwelling 11', but that a pair of wall openings 73 and 74, having manually operated registers therein, are provided for each of the upper floor areas 14 and 16.

The pipe 67 and the conduit 72 are both covered by an insulation and electric wire blanket 76, electrically connected to the house power by a grounded switch 77. Operation of the system 61 is such that air enters the duct 63 moving downward about the pipe 67 and losing heat to the ground 64 in the process. At the bottom open end 69 of the pipe 67, the air enters the pipe 67 and moves upwardly therethrough, and into conduit 72 for transmission into the area 14. Then, upon opening one or both of the wall outlets 73 and 74, the air exits therethrough setting up a circulation which is continually repeated.

It is to be noted that should the outlets 73 or 74 be closed in a particular area, for example the second floor area 16, by opening a window 78, such that air within the area 16 could escape, the same circulation would be set up as compared to opening one of the wall outlets. This action would hold true for the opening of any window on any floor.

The system 62 (FIG. 2) also comprises a vertical duct 79 which is supported in a hole 81 formed in the ground 64, and which duct 79 has a grate 82 covering the top thereof. The grate 82, as may be the grate 66 of the system 61 may have a filtering capacity so as to take out impurities from the air passing therethrough and downwardly into the duct 79.

Within the duct 79, an elongated pipe 83 is supported such that its lower open end 84 is spaced above the floor 85 of the hole 81, and wherein the pipe 83 is centrally located within the duct 79. The upper end 86 of the pipe 83 is closed and fluidly connected to a short pipe 87 which extends through a wall portion of the duct 79, and the wall 23 of the dwelling 11', with an inner end 88 of the pipe 87 adapted to transmit air into the second floor area 16.

An insulation and electric wire blanket 89 is wrapped about the pipe 83, with the electric wiring being connected to a grounded wall switch 91 for utilizing house power in energizing the electric wiring of the blanket 89. Referring to FIG. 3, an enlarged cross-section of the blanket 89 is shown, with the wiring illustrated by the reference numeral 80, and the insulation by the reference numeral 90. This type of blanket 89 is the same type of blanket 36 and 76 illustrated in the previously described systems 10 and 61.

Operation of the system 62 is such that air will enter through the grate 82 moving downwardly through the duct 79 to the bottom 85 of the hole 81, losing some heat in the process as it passes through the ground 64 area. The air then moves upwardly through the smaller pipe 83 and the short pipe 87 into the second floor area 16 of the house.

In either system 61 or 62, in the winter time the respective electric blankets 76 and 89 may be energized so as to heat the air moving through the respective ducts 63 and 79 such that the air moving into the dwelling 11' is warm. In both instances, and in reiteration should either wall outlet 73 or 74 be open, or the window 78 be cracked, for example, the air building up within the area is permitted to escape thereby, setting up the circulation action which continues until all wall or window outlets are closed. This, of course, assumes an airtight dwelling.

Referring to FIG. 4, a third embodiment of the system is indicated generally at 61' for use in conjunction with a dwelling 11'', which latter dwelling is substantially identical to the dwellings 11 and 11'' with like parts being indicated by like reference numerals.

The system 61' is substantially identical to the system 61 of the FIG. 2 embodiment, with like parts being indicated by like reference numerals; but wherein instead of having a short pipe 72, the system 61' has a serpentine pipe 92 connected at one end 93 to the inner pipe 63, with the opposite end 94 fluidly connected to the bottom 39 of the upright conduit 41, which conduit and its outlets 42 and 43 are identical to the conduit 41 of the FIG. 1 embodiment.

A blanket 96 of insulation and electric wiring is wrapped completely about the serpentine pipe 92 for the same purpose as the previously described systems, with the electric wiring being connected to the house power at a grounded wall switch 97. This blanket 96 is identical to the blanket 89 illustrated in detail in FIG. 3.

The operation of the system 61' is substantially identical to the operation of the other systems, with the exception that by having the serpentine type of pipe 92, a greater heat transfer is obtained, such that additional cooling of the air entering the duct 63 is provided.

These embodiments of the system of this invention are illustrative only, and it is to be remembered that various other embodiments and arrangements are contemplated within the full and intended scope of the invention.

I claim:
1. A heating and cooling system for an enclosure having at least one floor area defined by walls, a roof, and at least one floor, the system comprising:
   first air passage means at least a portion of which is surrounded by and extends into the ground;
   means embracing said first air passage means for periodically heating the air passing therethrough;
   second air passage means communicating said first air passage means with atmospheric air outside the enclosure;
   third air passage means communicating said first air passage means with the interior of the enclosure; and
   fourth air passage means formed in the enclosure which are normally closed, said fourth air passage means openable to aid in creating a self-flowing natural circulation of air through said first, second, and third air passage means, and through the enclosure.

2. A heating and cooling system as defined in claim 1, and wherein said embracing means includes an insulation and electric wire blanket.

3. A heating and cooling system as defined in claim 1, and wherein said first air passage means includes a duct having one end of a larger diameter than an opposite end, with said opposite end in fluid communication with said second air passage means, and with said third air passage means comprising a separate pair of pipes, one pipe communicating said one end with said fourth air passage means and the other pipe communicating said opposite end with the interior of the enclosure.

4. A heating and cooling system as defined in claim 3, and wherein said fourth air passage means includes a vertically extended conduit the lower end of which is in fluid communication with said one pipe, said conduit extended upwardly through the floor and into the floor area, said conduit having at least one closeable opening formed therein for communication with an upper part of the floor area, and the floor having a register-type opening formed therein at a part of the floor area opposite said closeable opening, said floor opening in fluid communication with said other pipe.

5. A heating and cooling system as defined in claim 1, and wherein said first air passage means is completely embraced within said second air passage means.

6. A heating and cooling system as defined in claim 5, and wherein said second air passage means comprises a vertically disposed circular, elongated duct, with said first air passage means comprising a vertically disposed, circular, elongated tube disposed along the vertical axis of said duct and of a smaller diameter, the upper end of said tube in fluid communication with said third air passage means, the lower end of said tube open to the interior of said duct.

7. A heating and cooling system as defined in claim 6, and wherein said fourth air passage means comprises a pair of closeable openings formed in one or more of the walls of the enclosure of a floor area with which said third air passage means is in communication.

8. A heating and cooling system as defined in claim 6, and wherein said third air passage means comprises an elongated, serpentine fluid transmitting member completely surrounded by the ground with an end thereof opposite the end connected to said tube in fluid communication with said fourth air passage means, said fourth air passage means comprising a vertically extended conduit extended upwardly through the floor and into the floor area, said conduit having at least one closeable opening formed therein for communication with an upper part of the floor area, and at least one wall within each floor area having a closeable opening formed therein at an end of the floor area opposite said conduit closeable opening.

References Cited

UNITED STATES PATENTS 2,680,354    6/1954    Gygax _____ 165—45

ROBERT A. O'LEARY, *Primary Examiner.*

CHARLES SUKALO, *Assistant Examiner.*

U.S. Cl. X.R.

165—50